United States Patent [19]
Evans et al.

[11] Patent Number: 5,499,609
[45] Date of Patent: Mar. 19, 1996

[54] LOW SPILLAGE METABOLIC FEEDER

[75] Inventors: JuliAnn Evans; Daniel P. Gundo, both of San Jose; Jennifer S. Harper, Sunnyvale; Gerald M. Mulenburg, Mountain View; Thomas L. Skundberg, San Jose, all of Calif.

[73] Assignee: The United States of America as represented by the Administrator of the National Aeronautics and Space Administration, Washington, D.C.

[21] Appl. No.: 217,909

[22] Filed: Mar. 25, 1994

[51] Int. Cl.⁶ .................................................. A01K 5/01
[52] U.S. Cl. ................................... 119/61; 119/18
[58] Field of Search .......................... 119/18, 61, 63

[56] References Cited

U.S. PATENT DOCUMENTS

| | | | |
|---|---|---|---|
| 1,166,100 | 12/1915 | White | 119/23 |
| 2,531,915 | 11/1950 | Maly | 119/18 |
| 2,684,051 | 7/1954 | Leblond et al. | 119/17 |
| 3,107,650 | 10/1963 | Cass | 119/17 |
| 3,227,139 | 1/1966 | Gass et al. | 119/17 |
| 3,505,977 | 4/1970 | Mancini | 119/63 X |
| 4,154,196 | 5/1979 | Gass | 119/17 |
| 4,785,765 | 11/1988 | Campbell et al. | 119/17 |
| 5,163,380 | 11/1992 | Duffy et al. | 119/15 |

FOREIGN PATENT DOCUMENTS

| | | | |
|---|---|---|---|
| 1222416 | 6/1960 | France | 119/18 |
| 689018 | 3/1953 | United Kingdom . | |

Primary Examiner—Robert P. Swiatek
Attorney, Agent, or Firm—Kenneth L. Warsh

[57] ABSTRACT

An animal feeder for use in a metabolic cage. The feeder includes a confined passageway and an adjustable notched gate proceeding a food cup. The gate is adjusted so that the entry area to the food cup approximates the cross sectional head area of the animal. Food ejected from the food cup by a caged animal is dropped through a grate into a spill tray.

8 Claims, 4 Drawing Sheets

LOW SPILLAGE METABOLIC FEEDER

ORIGIN OF THE INVENTION

The invention described herein was made in the performance of work under a NASA contract and is subject to the provisions of Section 305 of the National Aeronautics and Space Act of 1958, Public Law 85–568 (72Stat. 426; 42 U.S.C. 2457).

FIELD OF THE INVENTION

The present invention relates to metabolic animal enclosures and more specifically to a metabolic feeder device which collects food spilled by the animal and captures it in a container so that this spilled food can be accounted for.

BACKGROUND OF INVENTION

An important part of animal metabolic studies involves the study of the nutritional state, and the gastrointestinal and renal function of the animals. Metabolic enclosures typically provide for the collection of feces and urine but these metabolic end products are often contaminated with spilled food and neither the spilled food nor the animal wastes can be recovered quantitatively. What is needed is an apparatus for reducing food spillage and a means of catching spilled food to accurately determine food consumption and to prevent the spilled food from contaminating measurements of urine and fecal output.

U.S. Pat. No. 4,785,765 discloses a laminar diffuser which includes an inclined serrated linear ramp which directs the urine to a urine collection vessel and by its configuration, transports the feces past the urine collection vessel without mixing the two. This device has no apparatus for preventing spilled food from entering the fecal collector.

U.S. Pat. No. 2,684,051 and Canadian Patent No. 689,018, disclose a cage for laboratory animals having wire mesh walls and floor that allows animal droppings to pass through the floor into a funnel shaped container situated at the bottom of the cage where urine and feces are separated. The device also includes a metal food cup that is bolted to the floor of the cage and a rim that acts as a baffle to prevent the animal from scattering food particles over the wire mesh floor. The device does not measure spilled food and the wire mesh walls of the cage allow some food particles to leave the cage and not be accounted for.

U.S. Pat. No. 3,107,650 discloses a funnel shaped apparatus for separating feces from urine and preventing the loss of urine volume due to evaporation in laboratory animals. Contamination of the metabolic output by food is not covered in this invention.

U.S. Pat. No. 3,227,139 discloses a disposable animal metabolic cage that separates solid from liquid animal waste, prevents the evaporation of liquid waste and provides for the removal of solid and liquid waste without personal contact with any contaminated components. This device does not address contamination of the waste matter by spilled food.

U.S. Pat. No. 4,154,196 discloses an animal metabolism unit which is an improvement by the same inventors of U.S. Pat. No. 3,227,139. The device disclosed in the later patent reduces evaporation of liquid animal waste and affords ready access for removal of animal waste products.

U.S. Pat. No. 5,163,380 discloses a device for measuring food, water and oxygen consumption and the resulting metabolic outputs of laboratory animals on a real time or near real time basis, using telemetry. A radio-frequency transducer is embedded within the animal, and transmits heart rate, body temperature and blood pressure. The device is used for testing pharmacologically active substances on laboratory animals with known metabolic and psychologic characteristics in a sterile environment, where the testing itself is of short duration.

In many metabolic cages, the food dish is designed in such a manner that the animal can stand or sleep in the food and scatter it beyond the dish where it can mix with the discharged urine or escape the cage. There is a need or an improved feeder that reduces the chance of food spillage, allows any spilled food to be measured and keeps spilled food out of collected urine.

SUMMARY OF THE INVENTION

It is an object of the invention to provide a metabolic feeder that reduces the likelihood of food spillage.

An additional object of the invention is to provide an accurate means of determining unconsumed food in animal metabolic studies.

Another object of the present invention is to prevent the contamination of urine and feces by spilled food.

These and other objectives are met by providing a metabolic feeder which includes a confining passageway and an adjustable gate preceding a food container. The animal is unable to turn around in the passageway and the passageway has a grate floor that allows the passage of spilled food. A container is positioned underneath the grate to catch the spilled food so it can easily be weighed or otherwise measured.

DETAILED DESCRIPTION OF THE INVENTION

Figure 1:
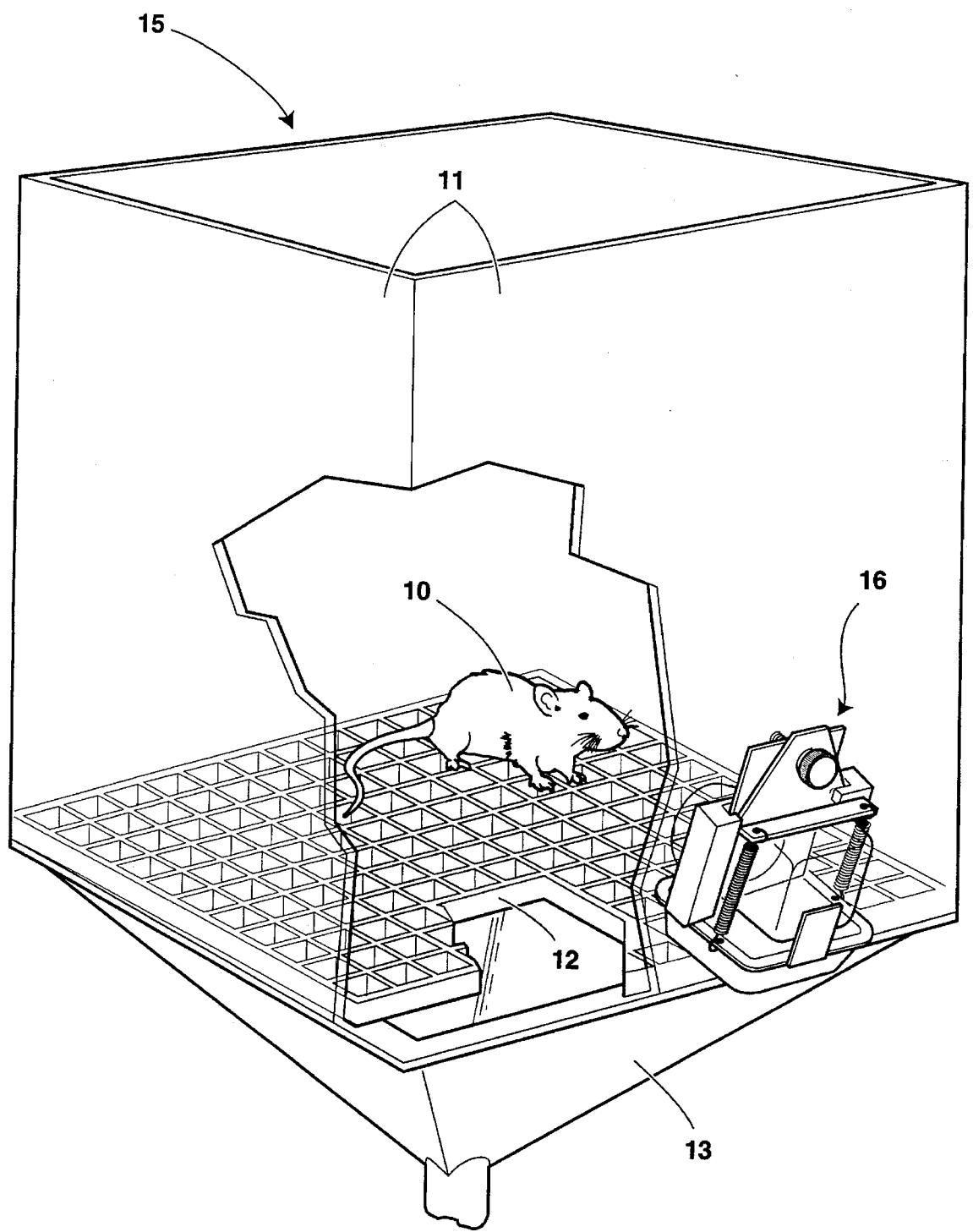
FIG. 1 is a perspective view, partially cut away, of a metabolic cage with a feeder, according to the present invention.

FIG. 1 depicts a metabolic cage 15 for confining a laboratory animal 10. Cage 15 has a perforated floor 12 and walls 11. The feces and urine discharged by the animal passes through the floor 12 where it is collected by funnel 13 and channeled onto conventional apparatus for separating and collecting the feces and urine (not shown).

Figure 2:
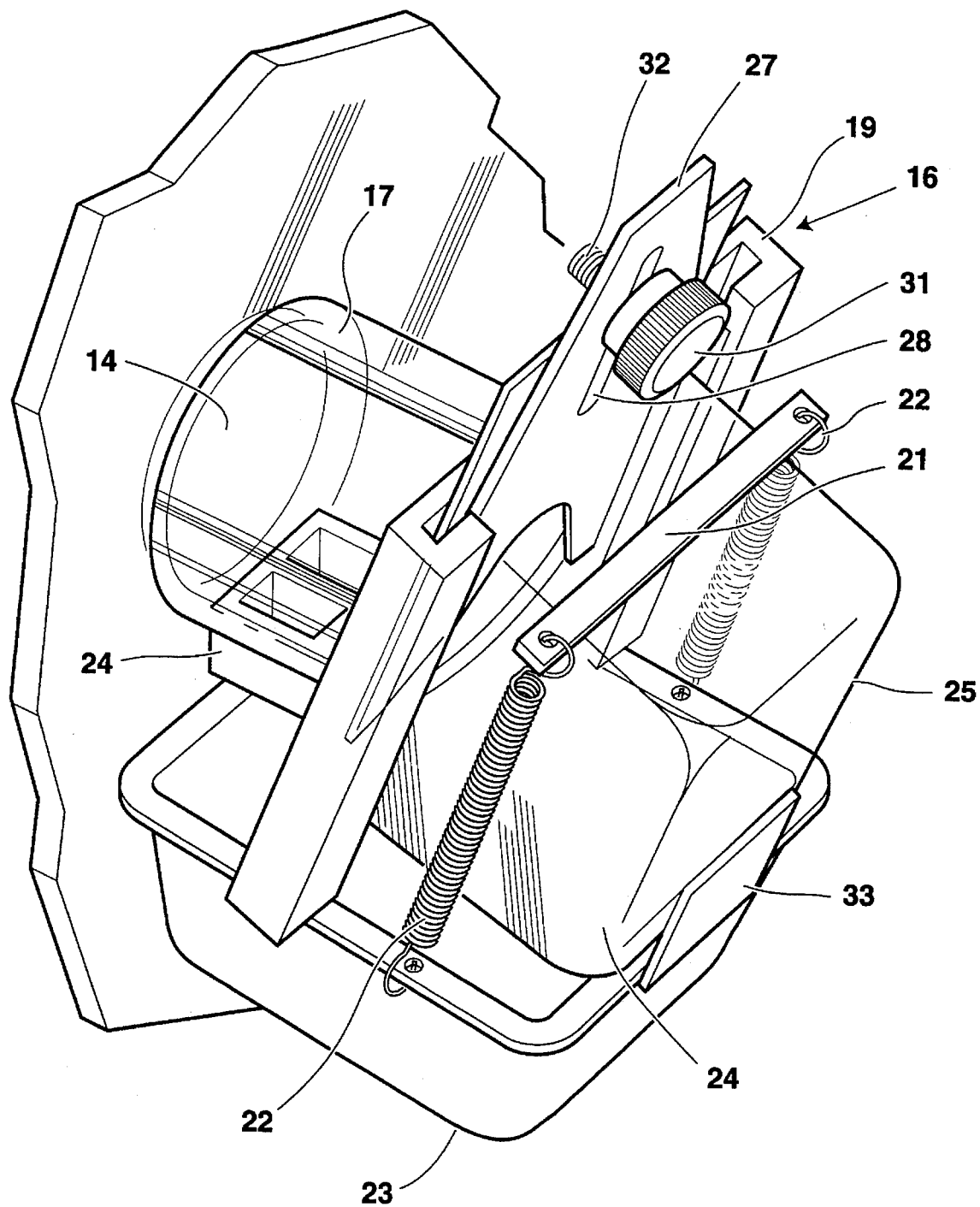
FIG. 2 is a close-up perspective view of the metabolic feeder.
Figure 3:
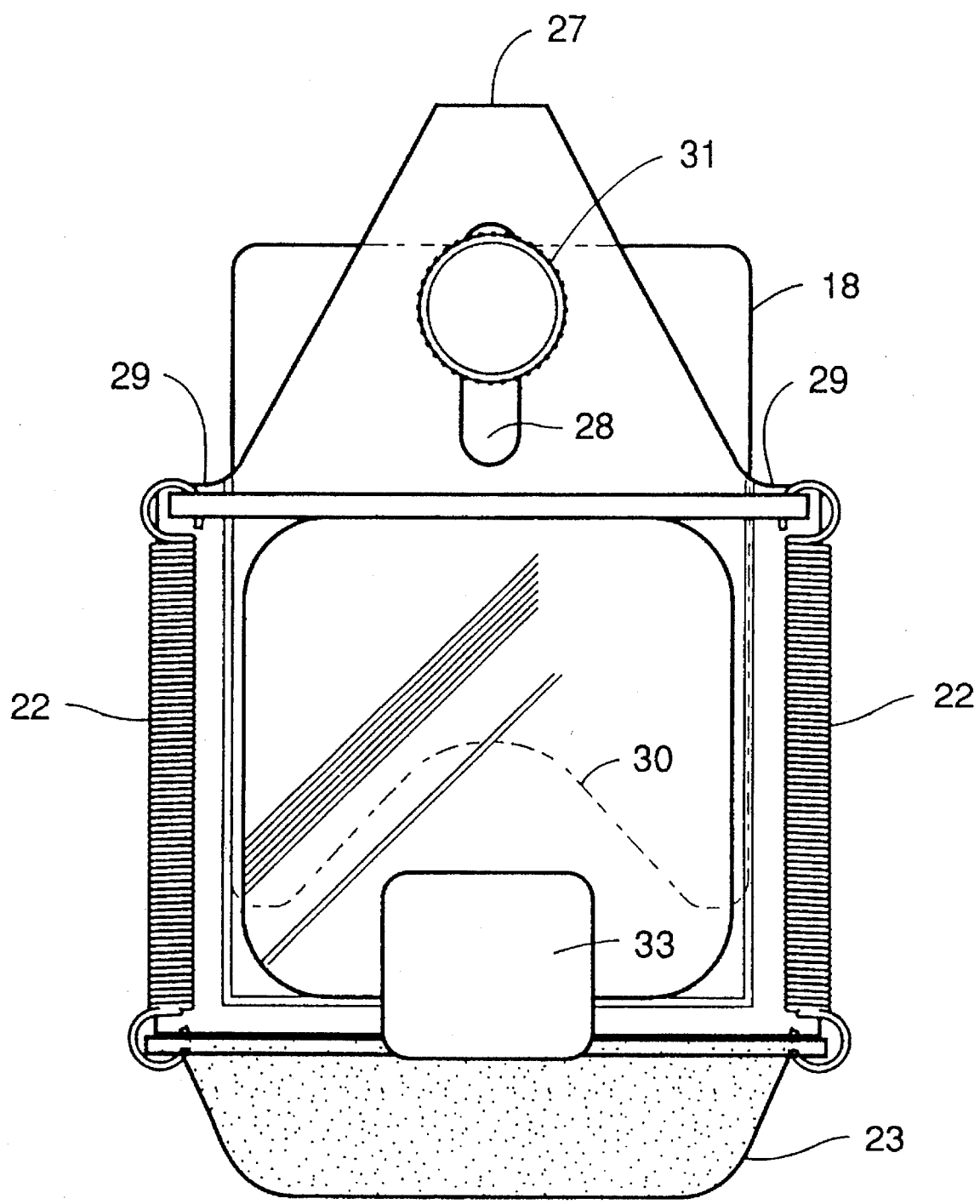
FIG. 3 is an elevational view of the metabolic feeder that readily discloses the shape of the adjustable gate and the notch in the lower extremity.
Figure 5:
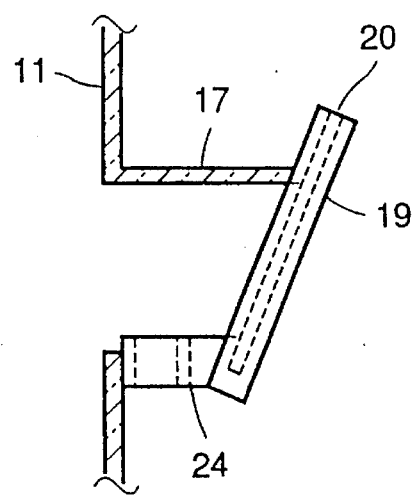
FIG. 5 is a side, partially cross-sectional view of the cage wall, tunnel, grate and guide.
Figure 6:
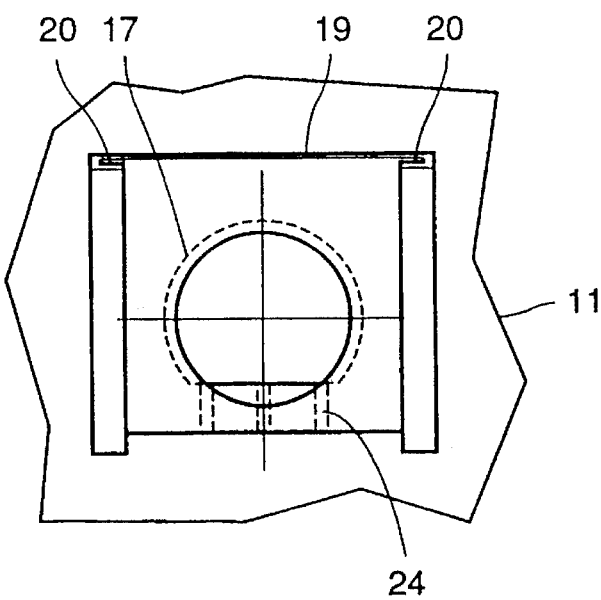
FIG. 6 is an elevational view of the guide with the food cup and gate removed.
Figure 4:
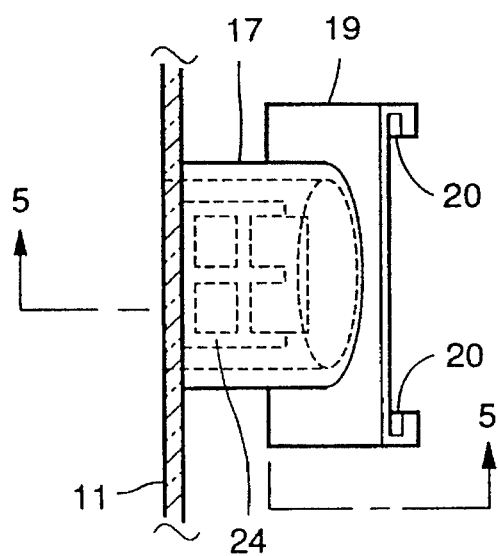
FIG. 4 is a plan view of the cage wall, tunnel, grate and guide.
Figure 7:
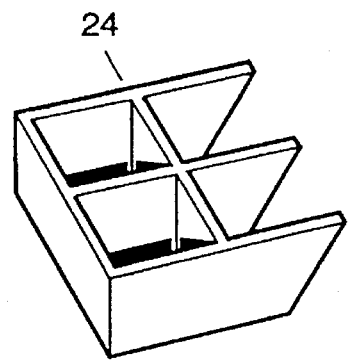
FIG. 7 is a perspective view of the grate in the base of the tunnel.

Feeder 16 is attached to one wall 11, and aperture 14 in the wall allows the animal egress to the feeder (see FIG. 2). A food cup 25 has a tab 27 with slot 28. In order for the animal to reach food (not shown) stored in food cup 25, the animal must crawl through a tunnel 17. Tunnel 17 preferably has a cross sectional area small enough to prevent the animal from turning around therein. Accordingly, the animal 10 must back out of tunnel 17 when it is through eating food from cup 25. The base of tunnel 17 has a grate 24 (FIGS. 2 and 4–7) with openings that are sufficient to enable the passage of the food. A guide 19 is affixed to the end of the tunnel 17 that is remote from wall 11. Slots 20 extend for nearly the length of guide 19. The slots 20 receive the lip 29 of food cup 25 and a gate 18 which has a curved notch 30 which is adapted to allow the passage of the head of the animal (FIG. 3). Guide 19 is oblique to the longitudinal axis of tunnel 17 making it tilted from the vertical. It is inclined in such a direction that food in food cup 25 will gravitate away from the tunnel and the gate. This helps prevent food from falling into the tunnel.

Bolt 32 is fastened to knob 31. Bolt 32 passes through slot 28 and a matching threaded aperture in gate 18. In operation, the knob 31 is turned so that gate 18 may move with respect to food cup 25. The vertical position of gate 18 is then adjusted so that the opening between notch 30 of the gate and the tunnel wall opposite thereto is just sufficient to admit the head of animal 10. Then knob 31 is tightened so that the gate and food cup are clasped together. The gate position is readjusted every time a different size animal is confined in the cage.

Spill tray 23 collects any food dropping through grate 24. The spill tray is held in position by means of springs 22 which each have an end connected to bar 21. Stop 33 catches the lip of the spill tray and insures that the spill tray will be aligned under grate 24. The gate makes it difficult for the animal to fully enter the food cup 25 and kick out food particles. To the extent that food is ejected beyond the food cup, they will most probably be dropped through grate 24. Bar 21 is fastened to food cup 25. The spill tray is removable. The cup is slid out of slots 20 of guide 19, and both containers may be weighed simultaneously (to determine the weight of the unconsumed food, and ultimately the actual amount of food consumed). It is preferable that cage walls 11, tunnel 17, and food cup 25 be constructed of a transparent material such as plastic.

What is claimed is:

1. A metabolic animal feeder comprising:

a food cup, means for varying the entry area to said foot cup, said means for varying the entry area including a gate and a guide, said gate and said food cup being supported by said guide, and a passageway abutting said means for varying the entry area, said passageway having a perforated floor whereby the floor perforations enable the passage of any food spilled from said food cup.

2. A metabolic animal feeder as claimed in claim 1 wherein said guide is positioned obliquely with said passageway.

3. A metabolic animal feeder as claimed in claim 1 wherein said means for varying the entry area further includes means for clamping together said gate and said food cup.

4. A metabolic animal feeder as claimed in claim 3 further comprising means for collecting any food passing through the floor of said passageway.

5. A metabolic animal feeder as claimed in claim 4 wherein said means for collecting food is a spill tray interconnected to said food cup.

6. A metabolic animal feeder as claimed in claim 5 wherein said passageway has a cross sectional area that prevents an animal from turning around therein.

7. A metabolic animal feeder comprising:

a tunnel having a grate flooring;

a food cup;

a slotted guide fastened to one end of said tunnel;

an adjustable notched gate;

said gate and said food cup being supported by and detachably removable from said guide; and the position of said gate determining the entry area to said food cup and said gate being interposed between said tunnel and said food cup whereby an animal seeking to reach the interior of said food cup must first crawl through said tunnel and then pass through said gate.

8. A metabolic animal feeder as claimed in claim 7 further comprising a container suspended under said grate flooring to collect food spilled from said food cup.

\* \* \* \* \*